Oct. 18, 1966     R. D. HUNT     3,279,554
GROUND EFFECT VEHICLES
Filed July 23, 1963                4 Sheets-Sheet 1

INVENTOR
Rowland Delville Hunt
BY
Stevens, Davis, Miller & Mosher
ATTORNEYS

Oct. 18, 1966 R. D. HUNT 3,279,554
GROUND EFFECT VEHICLES
Filed July 23, 1963 4 Sheets-Sheet 2

INVENTOR
Rowland Delville Hunt
BY
Stevens, Davis, Miller & Mosher
ATTORNEYS

Oct. 18, 1966  R. D. HUNT  3,279,554
GROUND EFFECT VEHICLES
Filed July 23, 1963  4 Sheets-Sheet 3

INVENTOR
Rowland Delville Hunt
BY
Stevens, Davis, Miller & Mosher
ATTORNEYS

Oct. 18, 1966 R. D. HUNT 3,279,554
GROUND EFFECT VEHICLES

Filed July 23, 1963 4 Sheets-Sheet 4

INVENTOR
Rowland Delville Hunt
BY
Stevens, Davis, Miller & Mosher
ATTORNEY

# United States Patent Office 3,279,554
Patented Oct. 18, 1966

3,279,554
GROUND EFFECT VEHICLES
Rowland Delville Hunt, Southampton, Hants, England, assignor to English Electric Aviation Limited, a British company
Filed July 23, 1963, Ser. No. 297,187
Claims priority, application Great Britain, July 31, 1962, 29,492/62; Aug. 31, 1962, 26,498/63
5 Claims. (Cl. 180—7)

The present invention relates to ground effect vehicles capable of steadily hovering at a predetermined height over the surface of the soil or water by an air cushion, and to the development of such vehicles in which a temporary increase in vertical thrust raises the vehicle beyond steady hovering height, for example for vertical takeoff and landing or short takeoff and landing technique or for leap vehicles.

Hitherto the air curtain surrounding the air cushion has been made over a closed perimeter, which involved difficulties in clearing obstacles while moving horizontally close to the ground.

According to the present invention air curtains produced by downward jets are provided only on the two sides of the air cushion, while the ends are sealed by yieldable walls. This arrangement has proved practically as efficient in ground effect as in air curtain over a closed perimeter of the air cushion, while allowing the vehicle to clear obstacles while moving horizontally close to the ground.

Moreover corrugated or concertina-like folded resilient curtains may be arranged alongside the air curtains in order to reduce lateral air losses from the ground effect cushions when the vehicle is clearing an obstacle while moving horizontally close to the ground.

In order that the invention may be clearly understood some embodiment will be explained hereinafter by way of example with reference to the accompanying drawings in which.

Figure 1:
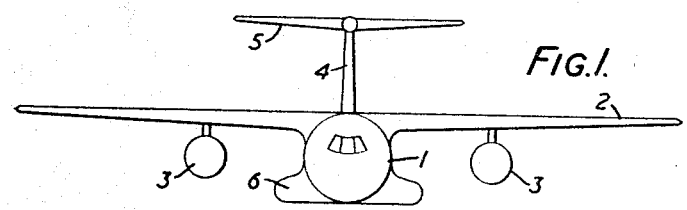
FIG. 1 is a diagrammatic front elevation of a short takeoff and landing aircraft according to the present invention.

Referring firstly to FIGS. 1 to 5 a fuselage 1 has a high wing 2 with propulsive engines arranged in pods 3 and an empennage consisting of a fin 4 and high tailplane 5. At the bottom of the fuselage 1 near the centre of gravity of the aircraft a ground effect undercarriage 6 is arranged instead of the conventional wheeled undercarriage. Air thrust curtains 7 are arranged along the sides only of this undercarriage 6 (FIG. 5), the air cushions of which are closed fore and aft by two-armed flaps 8 hinged about transverse axes 9 (FIG. 4) and extending into semicylindrical walls 10, so that the air cushion pressure on both arms of these flaps is balanced. These flaps can however, give way to an obstacle of a magnitude of an order of their own such as a boulder or log, when the vehicle moves horizontally close to the ground.

These flaps may be made each in one piece, or alternatively in sections capable of pivoting one independently of the others. They may be resiliently biased to the neutral position by springs 110 or pneumatic or hydraulic jacks 111 if desired.

Figure 6:
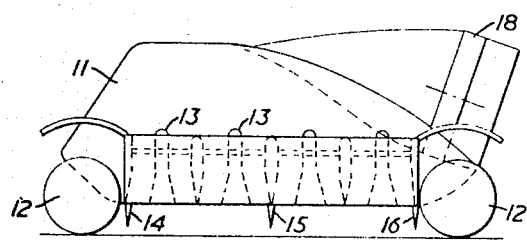
FIG. 6 is a side elevation of a leap vehicle.
Figure 7:
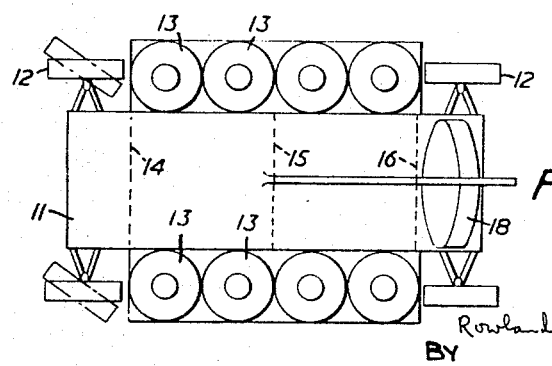
FIG. 7 is a plan view to FIG. 6 showing the arrangement of ground effect producing fans in two rows on the sides of the vehicle only.

Referring now to FIGS. 6 and 7, a leap vehicle 11 having road wheels 12 and a propulsive fan 18 for airborne propulsion has two sets of vertical thrust fans 13, one on each side, and yieldable walls 14, 15, 16 at the forward end, middle and rear end of the air cushion on the underside of the vehicle produced by the fans 13. Division of the air cushion by one or more inner walls such as 15 reduces losses of cushion air when one of the yieldable walls gives way to an obstacle and improves the control and stability of the vehicle when airborne.

Figure 8:
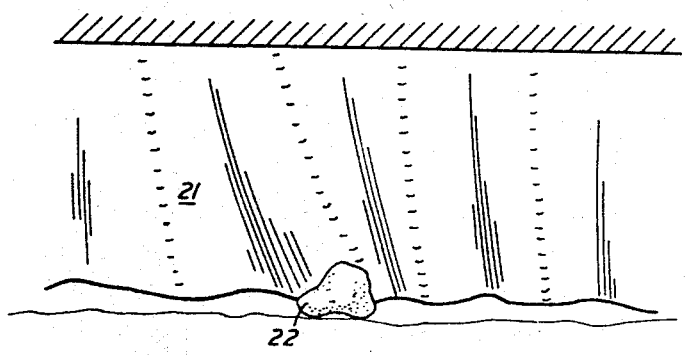
FIG. 8 is a side elevation.
Figure 9:
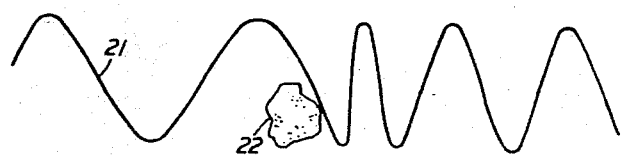
FIG. 9 is a plan view of a corrugated resilient wall bounding an air cushion, shown while clearing an obstacle.

FIGS. 8 and 9 diagrammatically illustrate a concertina type or corrugated resilient curtain 21 to be placed on the side of the air thrust curtains 7 (FIGS. 4, 5) or rows of thrust fans 13 (FIGS. 6, 7) in order to reduce air losses sideways. As shown in these figures, a minor obstacle 22 causes temporary resilient deformation of the corrugations, without substantially increasing the lateral gap between the lower edge of the curtain 21 and the ground. In the case of a large obstacle, the whole of the corrugations sweep backward in order to get over the obstacle, and return to their normal position under their own resilience.

Figure 10:
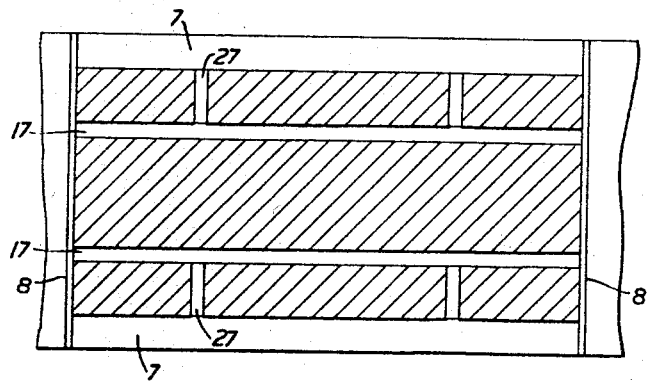
FIG. 10 is a diagrammatic plan view from underneath of an alternative ground effect cushion arrangement.

FIG. 10 shows how the plan form of the air cushion may be modified by providing two main lateral air thrust curtains 7, two auxiliary longitudinal inner air thrust curtains 17 and two transverse air thrust curtains 27. Two-armed flaps 8 are provided at the fore and aft ends as in FIGS. 4, 5 and also fore and aft of each of the two transverse air thrust curtains 27, and concertina-type resilient curtains 21 may be arranged alongside the main air thrust curtains 7 and alongside the auxiliary longitudinal air thrust curtains 17.

Figure 2:
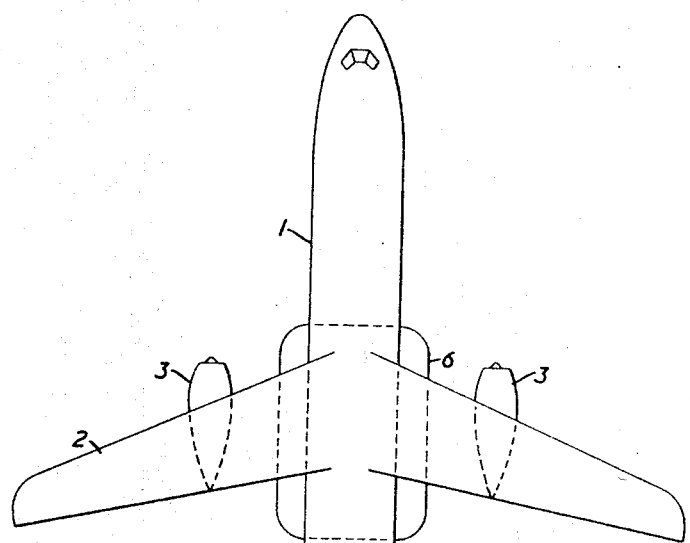
FIG. 2 is a plan view to FIG. 1.
Figure 3:
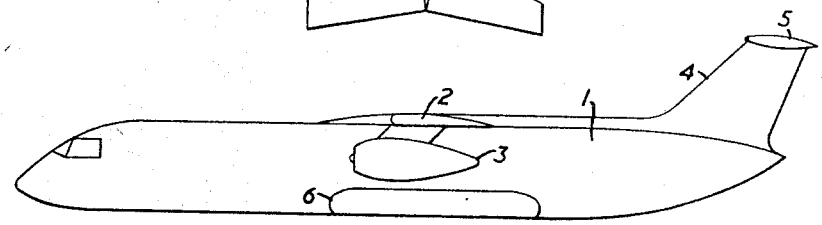
FIG. 3 is a side elevation to FIG. 1.
Figure 4:
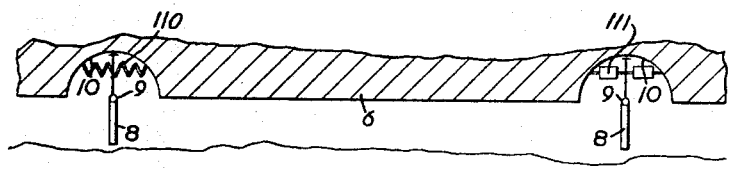
FIG. 4 is a diagrammatic longitudinal section of the underside of a ground effect vehicle having yieldable walls fore and aft of the air cushion.
Figure 5:
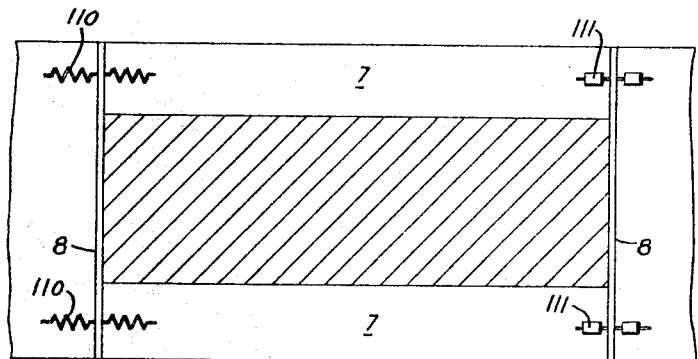
FIG. 5 is a plan view to FIG. 4.
Figure 11:
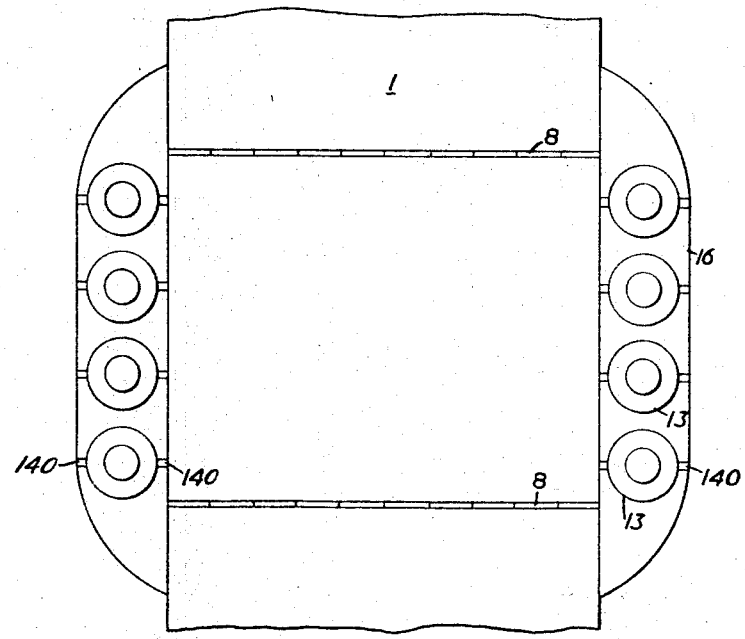
FIG. 11 is part of a diagrammatic plan view.
Figure 12:
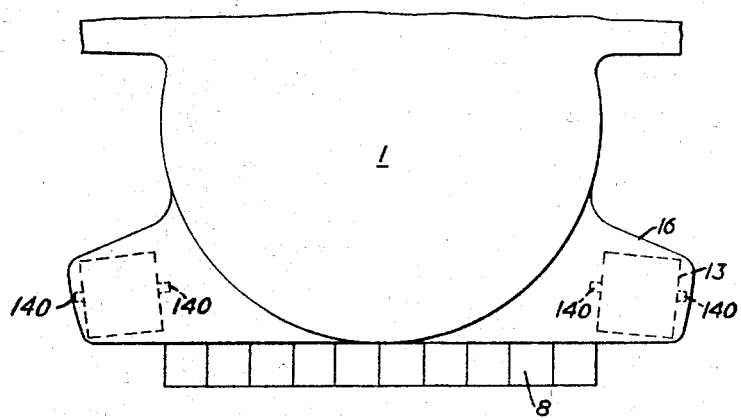
FIG. 12 is part of a diagrammatic end elevation of the air cushion undercarriage of an aircraft according to the invention.

FIGS. 11 and 12 show how vertical thrust fans 13 may be arranged in the ground effect undercarriage 6 of the aircraft according to FIGS. 1 to 3 in a manner similar to that shown in FIGS. 6 and 7 for a leap vehicle. The thrust engines 13 are pivotable about transverse axles 140.

As stated hereinabove, the division of the air cushion into separate parts improves the control and stability of the vehicle when airborne both in pitch and in roll.

What I claim as my invention and desire to secure by Letters Patent, is:

1. A gaseous jet thrust supported vehicle comprising in combination a substantially rectangular body having a flat bottom surface with lateral and transverse edges, lateral curtain producing jet means arranged along each of the lateral edges of said flat bottom surface extending approximately the full length of said lateral edges with the openings for the jet means directed downwardly and lying substantially in the plane of said flat bottom surface to produce lateral gas curtains along each lateral edge of said flat bottom surface, and yieldable wall means extending completely along the transverse edges of said flat bottom surface and projecting downwardly and substantially vertically from said flat bottom surface, said yieldable wall means in cooperation with the lateral gas curtains produced by said jet means and the flat bottom surface defining a rectangular enclosure to effect a ground effect cushion on the underside of said body.

2. A vehicle as claimed in claim 1, comprising zigzag folded resilient curtains arranged along and external to said lateral jet means, said resilient curtains reducing lateral gas losses from said ground effect cushion when clearing an obstacle while moving close to the ground.

3. A vehicle as claimed in claim 1, wherein said yieldable wall means have upper and lower portions, said flat bottom surface having semi-cylindrical recesses along the transverse edges thereof, said upper portions engaging tightly said semi-cylindrical recesses on said flat bottom surface of said vehicle, and said lower portions forming said yieldable wall means.

4. A vehicle as claimed in claim 1, comprising resilient means biasing said yieldable wall means into a neutral vertical position.

5. A vehicle as claimed in claim 1, wherein said yieldable wall means are divided into sections and means for independently pivoting each of said sections.

References Cited by the Examiner

UNITED STATES PATENTS

| | | | |
|---|---|---|---|
| 3,027,860 | 4/1962 | Priest | 114—67 |
| 3,078,938 | 2/1963 | Bollum | 180—7 |
| 3,078,940 | 2/1963 | Rolle | 180—7 |
| 3,117,747 | 1/1964 | Creasey et al. | 244—12 |
| 3,150,732 | 9/1964 | Walker | 180—7 |

FOREIGN PATENTS

| | | |
|---|---|---|
| 241,883 | 11/1962 | Australia. |
| 1,268,141 | 6/1961 | France. |
| 1,274,008 | 9/1961 | France. |
| 900,903 | 7/1962 | Great Britain. |

BENJAMIN A. BORCHELT, *Primary Examiner.*

SAMUEL FEINBERG, *Examiner.*

R. F. STAHL, *Assistant Examiner.*